(12) United States Patent
Bardsley

(10) Patent No.: US 6,693,479 B1
(45) Date of Patent: Feb. 17, 2004

(54) BOOST STRUCTURES FOR SWITCHED-CAPACITOR SYSTEMS

(75) Inventor: Scott Gregory Bardsley, Summerfield, NC (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/165,681

(22) Filed: Jun. 6, 2002

(51) Int. Cl.[7] .................................................. G05F 1/10
(52) U.S. Cl. ......................................... 327/390; 327/536
(58) Field of Search ................................. 327/534–537, 327/589, 390, 337; 363/59, 60

(56) References Cited

U.S. PATENT DOCUMENTS

| | | | |
|---|---|---|---|
| 5,825,230 A | 10/1998 | Chen | |
| 5,912,560 A * | 6/1999 | Pasternak | 324/536 |
| 5,969,513 A | 10/1999 | Clark | |
| 6,072,355 A | 6/2000 | Bledsoe | |
| 6,118,326 A * | 9/2000 | Singer et al. | 327/390 |
| 6,215,348 B1 | 4/2001 | Steensgaard-Madsen | |
| 6,271,715 B1 | 8/2001 | Pinchback | |
| 6,525,574 B1 * | 2/2003 | Herrera | 327/94 |
| 2003/0020533 A1 * | 1/2003 | Price et al. | 327/536 |

* cited by examiner

*Primary Examiner*—My-Trang Nuton
(74) *Attorney, Agent, or Firm*—Koppel, Jacobs, Patrick & Heybl

(57) ABSTRACT

Simple, inexpensive boost structures are realized with diode, switch and buffer circuits that operate in a charge mode and a boost mode to thereby generate a boost signal $S_{boost}$. The boost structures are especially suited for use in switched-capacitor systems.

33 Claims, 3 Drawing Sheets

US 6,693,479 B1

BOOST STRUCTURES FOR SWITCHED-CAPACITOR SYSTEMS

BACKGROUND OF THE INVENTION

1. Field of the Invention

The present invention relates generally to switched-capacitor systems and, more particularly, to boost structures in these systems.

2. Description of the Related Art

FIG. 1 illustrates a switched-capacitor system 20 in which a sample capacitor $C_s$ has a top plate 21 coupled to the inverting input of a differential amplifier 22 and a bottom plate 23 coupled through an input sample switch 24 to an input port 25. The differential amplifier 22 drives an output port 26 and a transfer capacitor $C_t$ is coupled across the differential amplifier. The differential amplifier has a high gain so that its non-inverting input has substantially the same potential as its inverting input. Finally, a second sample switch 27 and a transfer switch 28 are respectively coupled to the top and bottom plates 21 and 23.

In an operational sample mode, the input and second sample switches 24 and 27 are closed (as shown in FIG. 1) so that an analog input signal $S_{in}$ at the input port 25 urges an electrical sample charge $Q_s$ into the sample capacitor $C_s$ to thereby generate a sample signal $S_s = Q_s/C_s$ across the sample capacitor.

In an operational transfer mode, the first and second sample switches 24 and 27 are opened and the transfer switch 28 is closed. The bottom plate 23 is thus grounded through the closed, transfer switch. Because the signal across the sample capacitor $C_s$ is now substantially zero, the sample charge $Q_s$ is transferred into the transfer capacitor $C_t$ to generate an output processed signal $S_{prcsd} = Q_s/C_t$ at the output port 26. The sample and transfer operations of FIG. 1 thereby generate a $S_{prcsd}/S_{in}$ transfer function of $C_s/C_t$ and this transfer function is represented in the graph 30 of FIG. 2 by a plot 32 which has a slope of $C_s/C_t$.

The switched-capacitor system 20 (and differential versions thereof) is especially suited for use as a sampler in a variety of signal conditioning systems (e.g., a pipelined analog-to-digital converter (ADC)). In such systems, the switches of the system 20 of FIG. 1 are typically realized with complementary metal-oxide-semiconductor (CMOS) transistors. This realization is exemplified in FIG. 1 by a CMOS transistor 34 that is substituted for the input sample switch as indicated by the substitution arrow 35.

In pipelined ADCs, an initial ADC stage (e.g., a flash ADC) typically converts an analog input signal into at least one most-significant bit $D_o$ of a digital output signal that corresponds to the input signal $S_{in}$. At the same time, the sampled signal is processed into a residue signal $S_{res}$ that is suitable for subsequent processing by downstream ADC stages into the less-significant bits of the output digital signal.

If the initial ADC stage is a 1.5 bit converter stage, for example, it provides a residue signal $S_{res}$ that corresponds to the plot 36 in FIG. 2 which has two steps 37 that are equally spaced from the midpoint of the range of the input signal $S_{in}$. The steps are initiated by decision signals from the initial ADC stage. The plot 36 of the residue signal $S_{res}$ has three segments defined by the steps 37 and each segment has a slope that is twice the slope of the plot 32.

The residue signal illustrated by the plot 36 can be generated, for example, by supplementing the sample capacitor $C_s$ of FIG. 1 with an additional sample capacitor to realize the increased slope (i.e., increased gain) and by replacing the transfer switch 28 with a multipole transfer switch 38 as indicated by the substitution arrow 39. The transfer switch responds to digital decision signals $S_{dgtl}$ from the initial ADC stage by applying selected offset signals (e.g., +V and −V) to the bottom plates of the sample capacitors. The offset signals generate the steps 37 in the plot 32 of FIG. 2. When the switched-capacitor system 20 of FIG. 1 is modified in this fashion, it is typically referred to as a multiplying digital-to-analog converter (MDAC).

Accuracy and bandwidth of switched-capacitor structures is strongly dependent upon the on resistance $r_{on}$ of its switches. For example, the on resistance $r_{on}$ of the input sample switch 24 of FIG. 1 and the capacitance of the sample capacitor establishes (along with the on resistance $r_{on}$ of the second sample switch 27) a time constant for acquisition of the analog input signal $S_{in}$. The switch on resistance $r_{on}$ thus limits the acquisition time and the bandwidth of switched-capacitor structures. More importantly, the on resistance $r_{on}$ of the input sample switch 24 will vary with the input signal $S_{in}$ thus inducing distortion in the sampled charge $Q_s$.

Although the on resistance $r_{on}$ can be reduced by using a larger device (i.e., a larger CMOS transistor 34 in FIG. 1), this unfortunately increases the associated capacitances (e.g., drain and source-to-gate capacitances and drain and source-to-bulk capacitances). If the on resistance $r_{on}$ can be sufficiently reduced by other means, however, freedom is then gained to select a larger device which will reduce the associated capacitances and thus further reduce distortion and enhance speed.

Accordingly, reduction of switch on resistance $r_{on}$ is an important consideration in the design of switched-capacitor structures. When the switches are realized as CMOS transistors, this reduction can be achieved by applying a substantial gate-to-source voltage $V_{gs}$. Photolithographic techniques for the fabrication of modern signal conditioning systems are directed, however, to realizing greater circuit densities by the use of thinner line widths and these thinner lines also require lower supply voltages (e.g., $V_{DD}$). This limits the available gate-to-source voltage $V_{gs}$ which in turn, makes it more difficult to realize a low on resistance $r_{on}$.

Although it is important to reduce the magnitude of the on resistance $r_{on}$, it is also important to keep it substantially constant during signal acquisition because, otherwise, the acquired signal is distorted and degraded. There is, accordingly, an ongoing need for circuit structures that can achieve low and constant switch on resistances $r_{on}$ in the presence of ever-reducing supply voltages.

BRIEF SUMMARY OF THE INVENTION

The present invention is directed to simple, reliable and inexpensive boost structures that operate in a charge mode and a boost mode to thereby generate a boost signal $S_{boost}$. These goals are realized with diode, switch and buffer structures that are configured to enhance speed and obtain simplification in the generation of boost signals.

The novel features of the invention are set forth with particularity in the appended claims. The invention will be best understood from the following description when read in conjunction with the accompanying drawings.

DETAILED DESCRIPTION OF THE INVENTION

Figure 3:
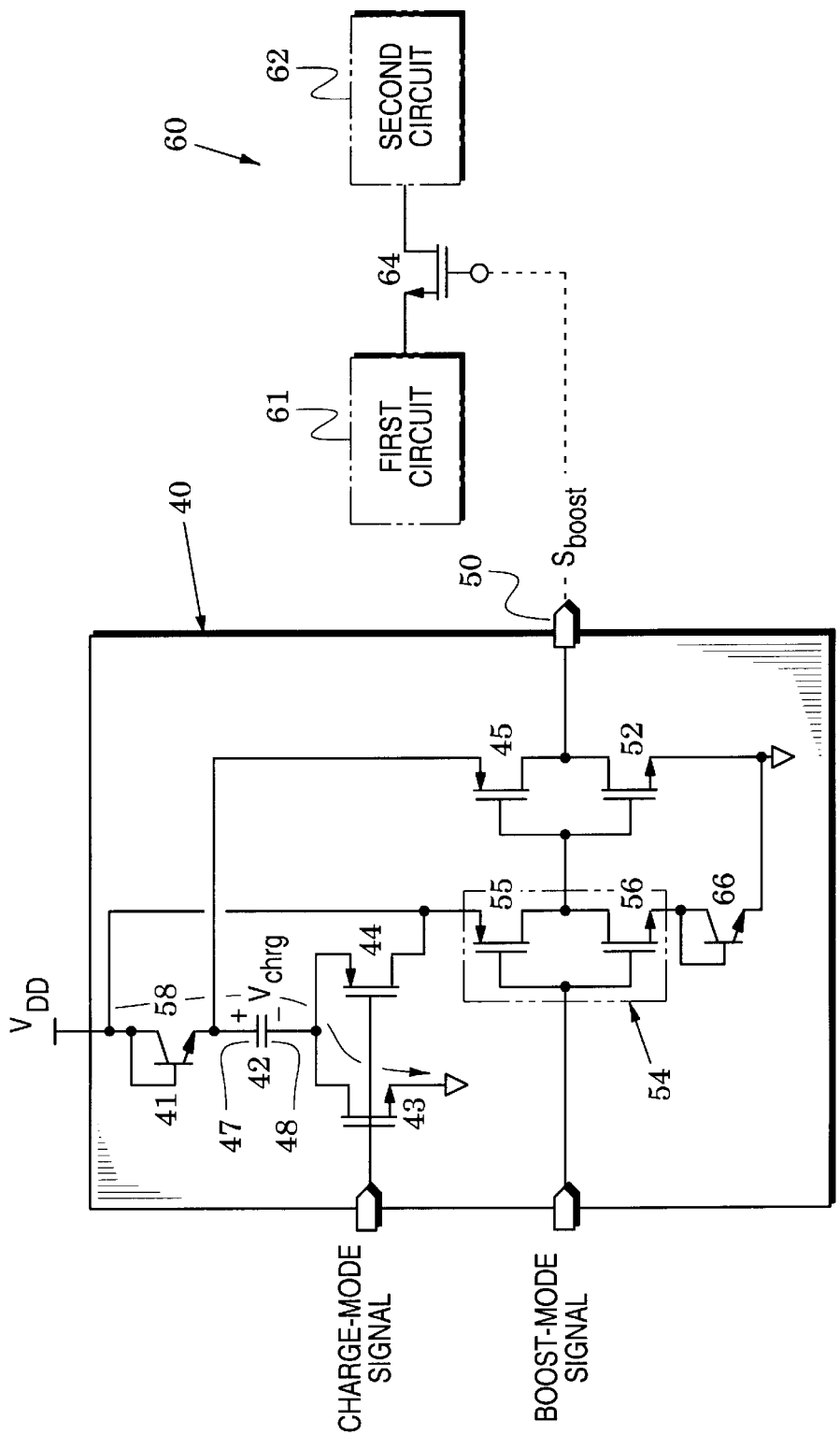
FIG. 3 is a schematic of a boost structure embodiment of the present invention for use in switched-capacitor systems (e.g., the systems of FIG. 1)

FIG. 3 illustrates a simple, reliable and inexpensive boost structure that operates in a charge mode and a boost mode to thereby generate a boost signal $S_{boost}$.

In particular, the boost structure 40 includes a diode 41, a boost capacitor 42, and first, second and third switches 43, 44 and 45. The boost capacitor has top and bottom plates 47 and 48 and the diode 41 couples the top plate 47 to a first reference voltage (e.g., $V_{DD}$) while the first switch 43 couples the bottom plate 48 to a second reference voltage (e.g., ground). The third switch 45 provides access to the boost signal. That is, the third switch couples the top plate 47 to a boost port 50 that provides the boost signal $S_{boost}$.

The boost structure 40 also includes a fourth switch 52 that couples the boost port 50 to ground. The third and fourth switches 45 and 52 are driven, in the embodiment of FIG. 3, by an inverter 54 that is formed by drain-coupled transistors 55 and 56. In the embodiment of FIG. 3, the first, second, third and fourth switches 43, 44, 45 and 52 and the inverter 54 are realized with CMOS transistors. Although the diode 41 may be realized as a diode-connected CMOS transistor, it is preferably realized (and shown) as a diode-connected bipolar junction transistor. In a different embodiment, the diode 41 may be realized with the source and drain regions of a CMOS transistor as one diode electrode and the body region of this transistor as the other diode electrode.

In a charge operational mode, a charge-mode signal is applied to turn on the first switch 43 which couples a current 58 through the boost capacitor 42 and charges it to a charge voltage $V_{chrg}$ that substantially equals $V_{DD}$ (less voltage drops across the diode 41 and the turned-on first switch 43). In this mode, the charge-mode signal keeps the second switch 44 in an off condition and a boost-mode signal is in a low state which couples, via the inverter 54, a high state to the third switch 45 to maintain this switch also in an off condition. This same high state maintains the fourth switch 52 in an on condition so that the boost signal $S_{boost}$ substantially equals ground.

In a boost operational mode, a boost-mode signal provides, via the inverter 54, a low state that places the third switch 45 in an on condition and the fourth switch 52 in an off condition. The charge-mode signal is now in a low state so that the first switch 43 is also in an off condition and the second switch 44 is in an on condition. Accordingly, the bottom plate 48 is coupled through the second switch 44 to the first reference voltage and the top plate 47 is coupled through the third switch 45 to the boost port 50. The boost signal $S_{boost}$ thus substantially equals $V_{DD}+V_{chrg}$ or approximately $2V_{DD}$. In the boost mode, the boost capacitor 42 acts as a floating potential source that supplements the first reference voltage $V_{DD}$.

Figure 2:
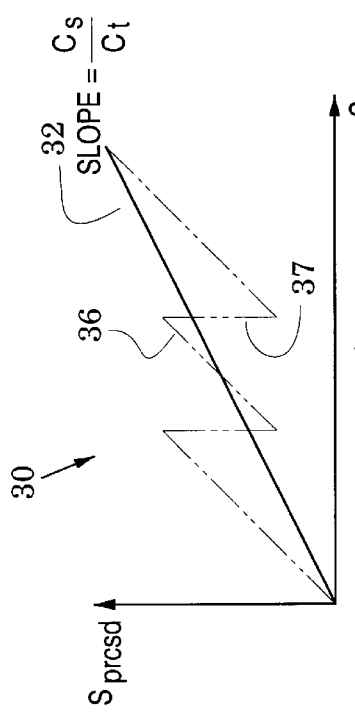
FIG. 2 is a graph which shows transfer functions in the switched-capacitor systems of FIG. 1.
Figure 1:
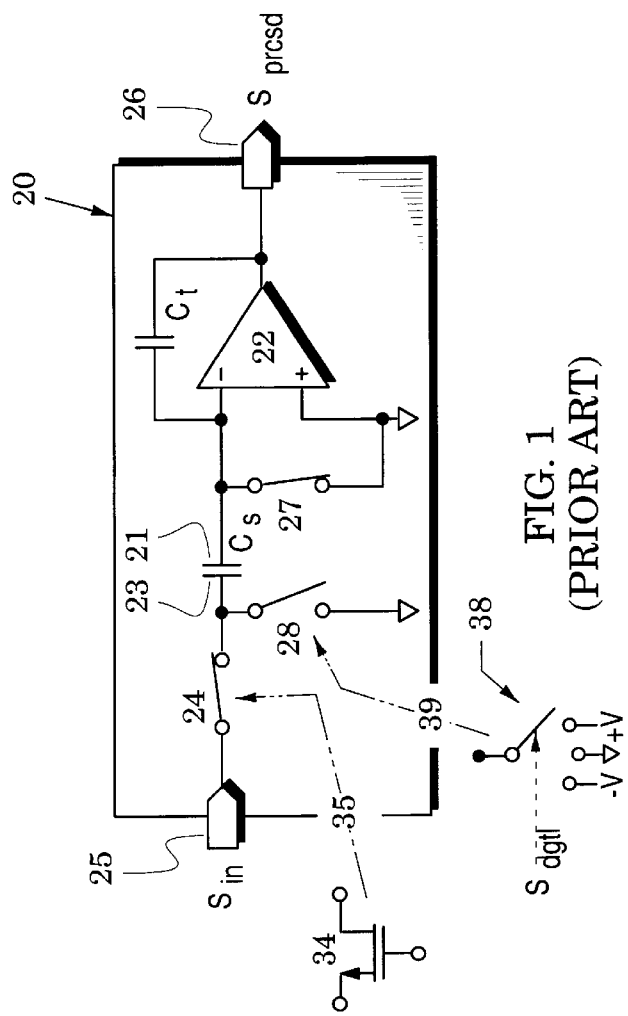
FIG. 1 is a schematic of exemplary switched-capacitor systems.

The boost signal $S_{boost}$ can be applied to an exemplary system 60 of FIG. 3 in which a switch 63 couples a first circuit 61 and a second circuit 62. For example, the switch 63 may be the CMOS transistor 34 of the switched-capacitor structure 20 of FIG. 1, the second circuit 62 may include the sample capacitor $C_s$ of FIG. 1 and the first circuit 61 may be a circuit that provides an input signal $S_{in}$ through the analog input port 25 of FIG. 1. In this example, the boost signal $S_{boost}$ would realize a significantly-lower on resistance $r_{on}$ in the CMOS transistor 34 which would reduce variability of $r_{on}$ to thereby reduce distortion and also significantly lower the time constant associated with the sample capacitor $C_s$ and thereby significantly increase the bandwidth of the switched-capacitor structure 20.

When compared to other structures (e.g., a switch in the form of a CMOS transistor), the diode 41 simplifies the boost structure 40 and significantly enhances its speed. It is simpler because the diode 41 does not require the generation of switch-control signals and, when realized as a diode-connected bipolar junction transistor, it is faster because the diode's high transconductance $g_m$ reduces the charge time of the boost capacitor 42.

In various realizations of the boost structure 40 of FIG. 3, it may be advisable to lessen the possibility of breakdown in various transistors. For example, FIG. 3 inserts a diode-connected transistor 66 between the inverter 54 and ground to thereby reduce the gate-to-source and gate-to-drain voltages of the third switch 45 and the gate-to-drain voltage of the fourth switch 52.

Figure 4:
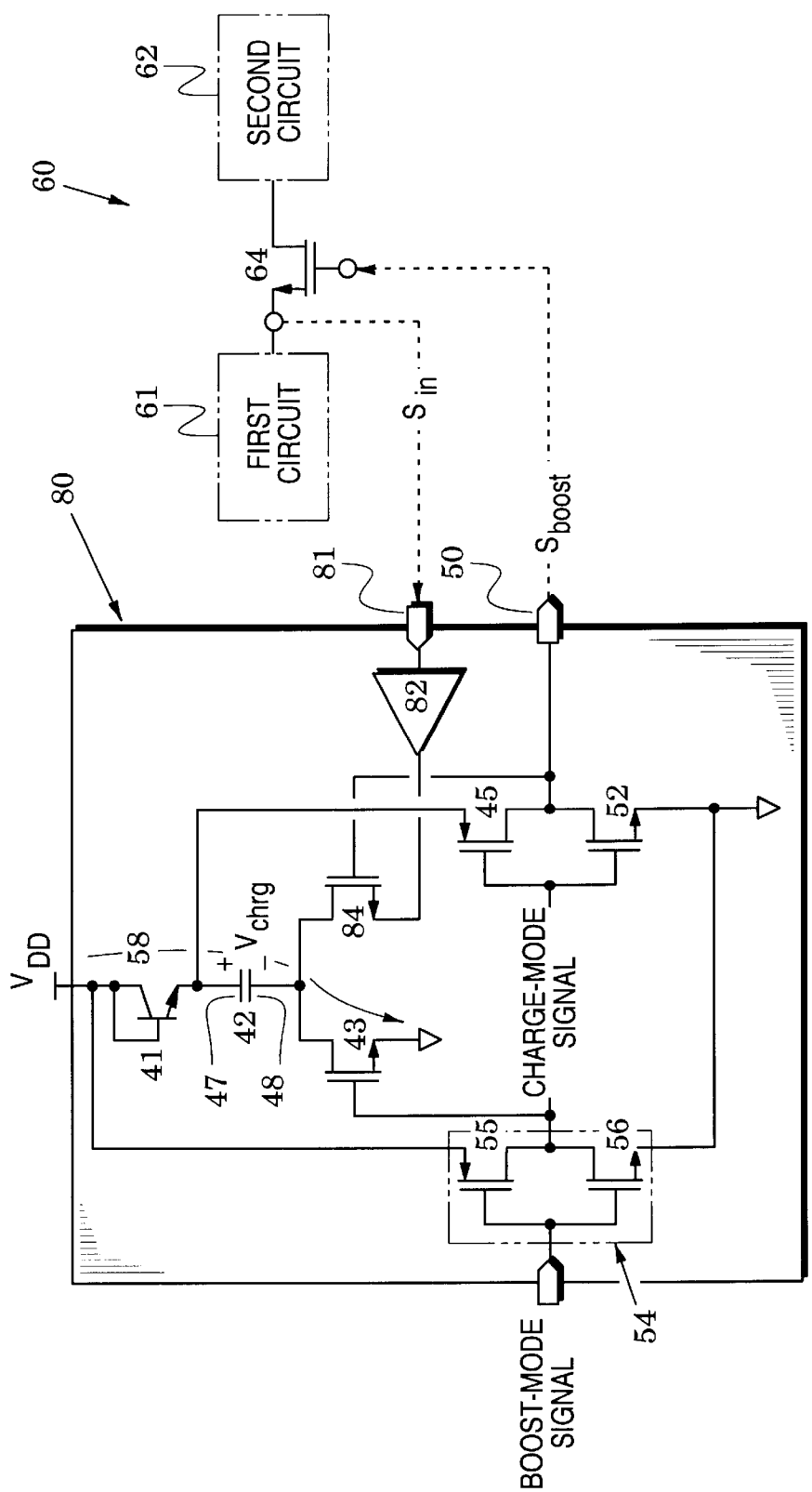
FIG. 4 is a schematic of another boost structure embodiment.

FIG. 4 illustrates a boost structure embodiment 80 that includes some elements of the boost structure embodiment 40 of FIG. 3 with like elements indicated by like reference numbers. In contrast to the embodiment 40, however, a sample of an input signal $S_{in}$ from the first circuit 61 is directed through an input port 81 and an analog buffer 82 to a second switch 84 which is an inverted version of the second switch 44 of FIG. 3. In addition, the second switch 84 is coupled to respond to the boost signal $S_{boost}$ rather than the charge-mode signal as in FIG. 3.

Essentially, the inverter 54 generates a charge-mode signal in response to a boost-mode signal at its input. When the charge-mode signal is in a high state, the first switch 43 and the fourth switch 52 are in an on condition and the third switch 45 is in an off condition. The boost signal $S_{boost}$, therefore, is in a low state which causes the second switch 84 to also be in the off condition. In this mode, the first switch 43 couples the current 58 through the boost capacitor 42 and charges it to a charge voltage $V_{chrg}$ that substantially equals $V_{DD}$.

When the boost-mode signal is in a high state, the second switch 43 and the fourth switch 52 are in an off state and the third switch 45 is in an on state. The boost signal $S_{boost}$ rises and turns on the second switch 84 so that the input signal $S_{in}$ is coupled through the analog buffer 82 and the second switch 84 to the bottom plate 48.

Accordingly, the boost signal $S_{boost}$ is nearly $S_{in}+V_{DD}$ and the gate-to-source voltage across the switch 64 of the system 60 is substantially a constant $V_{DD}$ throughout the acquisition mode of the system 60. The switch's on resistance $r_{on}$ thus remains constant during the acquisition mode which reduces distortion and enhances accuracy of signals provided to the second circuit 62.

If the first circuit 61 of FIG. 3 also generates the input signal $S_{in}$ at the input of the switch 64, this switch is presented with a bias signal approximately equal to $2V_{DD}-S_{in}$. Because the input signal may vary during the acquisition mode of the exemplary system 60, the bias signal $2V_{DD}-S_{in}$ also varies during the acquisition mode. If the switch 64 is a CMOS transistor, its on resistance $r_{on}$ will thereby vary during the acquisition mode which degrades the accuracy of signals provided to the second circuit 62. This variation is removed in the boost structure 80 of FIG. 4. Although the input signal $S_{in}$ may be directly applied to the second switch 84 of FIG. 4, the buffer 82 is preferably inserted to better isolate the system 60 from any external disturbance.

It is noted that the terms of top and bottom plates have been used above for clarity of description, that equivalent terms (e.g., first and second plates) could be substituted and that top and bottom do not necessarily imply a spatial relationships.

Simple, fast and inexpensive boost structure embodiments have been described which can significantly reduce and stabilize the on resistance $r_{on}$ of switch elements in various signal conditioning systems such those which include switched-capacitor systems.

Although embodiments of the invention have been described with reference to single-ended structures, differential embodiments follow directly from the description. Although boost structure embodiments have been primarily described with CMOS transistors, other embodiments may be realized with various other transistor types and combinations.

The embodiments of the invention described herein are exemplary and numerous modifications, variations and rearrangements can be readily envision ed to achieve substantially equivalent results, all of which are intended to be embraced within the spirit and scope of the invention as defined in the appended claims.

I claim:

1. A boost structure that generates a boost signal and operates in a charge mode and a boost mode, comprising:
   a boost capacitor having a bottom plate and a top plate;
   a diode that couples said top plate to a first reference signal; and
   a switch network that couples said bottom plate to a second reference signal in said charge mode, couples said bottom plate to said first reference signal in said boost mode and provides access to said top plate in said boost mode.

2. The structure of claim 1, wherein said diode is a diode-connected bipolar junction transistor.

3. The structure of claim 1, wherein said diode is a diode-connected metal-oxide-semiconductor (MOS) transistor.

4. The structure of claim 1, wherein said diode has first and second electrodes and at least one of the source and drain regions of a metal-oxide-semiconductor (MOS) transistor are said first electrode and the body region of said MOS transistor is said second electrode.

5. The structure of claim 1, wherein said switch network includes:
   a first switch coupled to said bottom plate and coupled to receive said second reference signal;
   a second switch coupled to said bottom plate and coupled to receive said first reference signal; and
   a third switch coupled to provide access to said top plate.

6. The structure of claim 5, wherein said first, second and third switches are complementary metal-oxide-semiconductor (MOS) transistors.

7. The structure of claim 5, further including a fourth switch that couples said third switch to said second reference signal in said charge mode.

8. The structure of claim 7, wherein said fourth switch is a metal-oxide-semiconductor (MOS) transistors.

9. The structure of claim 1, wherein said second reference signal is ground and said first reference signal is a voltage referenced to said ground.

10. A boost structure that generates a boost signal and operates in a charge mode and a boost mode, comprising:
    a boost capacitor having a bottom plate and a top plate;
    a diode that couples said top plate to a first reference signal; and
    a switch network that couples said bottom plate to a second reference signal in said charge mode, couples said bottom plate to receive an external signal in said boost mode and provides access to said top plate in said boost mode.

11. The structure of claim 10, wherein said diode is a diode-connected bipolar junction transistor.

12. The structure of claim 10, wherein said diode is a diode-connected metal-oxide-semiconductor (MOS) transistor.

13. The structure of claim 10, wherein said diode has first and second electrodes and at least one of the source and drain regions of a metal-oxide-semiconductor (MOS) transistor are said first electrode and the body region of said MOS transistor is said second electrode.

14. The structure of claim 10, wherein said switch network includes:
    a first switch coupled to said bottom plate and coupled to receive said second reference signal;
    a second switch coupled to said bottom plate and coupled to receive said external signal; and
    a third switch coupled to provide access to said top plate.

15. The structure of claim 14, wherein said first, second and third switches are complementary metal-oxide-semiconductor (MOS) transistors.

16. The structure of claim 14, further including an analog buffer that couples said external signal to said second switch.

17. The structure of claim 14, further including a fourth switch that couples said third switch to said second reference signal in said charge mode.

18. The structure of claim 17, wherein said fourth switch is a metal-oxide-semiconductor (MOS).

19. The structure of claim 10, wherein said second reference signal is ground and said first reference signal is a voltage referenced to said ground.

20. A sampler system that samples an analog input signal in a sample mode and provides a corresponding sample signal in a hold mode, the system comprising:
    a sampler that has an input transistor arranged to receive said input signal;
    a boost capacitor having a bottom plate and a top plate;
    a diode that couples said top plate to a first reference signal; and
    a switch network that couples said bottom plate to a second reference signal in said charge mode, couples said bottom plate to said first reference signal in said boost mode and couples said top plate to said input transistor in said boost mode.

21. The system of claim 20, wherein said switch network includes:
    a first switch coupled to said bottom plate and coupled to receive said second reference signal;
    a second switch coupled to said bottom plate and coupled to receive said first reference signal; and
    a third switch coupled between said top plate and said input transistor.

22. The system of claim 21, further including a fourth switch that couples said third switch to said second reference signal in said charge mode.

23. A sampler system that samples an analog input signal in a sample mode and provides a corresponding sample signal in a hold mode, the system comprising:

a sampler that has an input transistor arranged to receive said input signal;

a boost capacitor having a bottom plate and a top plate;

a diode that couples said top plate to a first reference signal; and a switch network that couples said bottom plate to a second reference signal in said charge mode, couples said bottom plate to receive an external signal in said boost mode and couples said top plate to said input transistor in said boost mode.

24. The system of claim 23, wherein said switch network includes:

a first switch coupled to said bottom plate and coupled to receive said second reference signal;

a second switch coupled to said bottom plate and coupled to receive said external signal; and a third switch coupled between said top plate and said input transistor.

25. The system of claim 24, further including an analog buffer that couples said external signal to said second switch.

26. The system of claim 24, further including a fourth switch that couples said third switch to said second reference signal in said charge mode.

27. A multiplying digital-to-analog converter (MDAC) system that samples an analog input signal in a sample mode and provides a corresponding sample signal in a hold mode, the system comprising:

an MDAC that has an input transistor arranged to receive said input signal;

a boost capacitor having a bottom plate and a top plate;

a diode that couples said top plate to a first reference signal; and a switch network that couples said bottom plate to a second reference signal in said charge mode, couples said bottom plate to said first reference signal in said boost mode and couples said top plate to said input transistor in said boost mode.

28. The system of claim 27, wherein said switch network includes:

a first switch coupled to said bottom plate and coupled to receive said second reference signal;

a second switch coupled to said bottom plate and coupled to receive said first reference signal; and a third switch coupled between said top plate and said input transistor.

29. The system of claim 28, further including a fourth switch that couples said third switch to said second reference signal in said charge mode.

30. A multiplying digital-to-analog converter (MDAC) system that samples an analog input signal in a sample mode and provides a corresponding sample signal in a hold mode, the system comprising:

an MDAC that has an input transistor arranged to receive said input signal;

a boost capacitor having a bottom plate and a top plate;

a diode that couples said top plate to a first reference signal; and a switch network that couples said bottom plate to a second reference signal in said charge mode, couples said bottom plate to receive an external signal in said boost mode and couples said top plate to said input transistor in said boost mode.

31. The system of claim 30, wherein said switch network includes:

a first switch coupled to said bottom plate and coupled to receive said second reference signal;

a second switch coupled to said bottom plate and coupled to receive said external signal; and a third switch coupled between said top plate and said input transistor.

32. The system of claim 31, further including an analog buffer that couples said external signal to said second switch.

33. The system of claim 31, further including a fourth switch that couples said third switch to said second reference signal in said charge mode.

* * * * *